US010636177B2

(12) United States Patent
Balestrieri

(10) Patent No.: US 10,636,177 B2
(45) Date of Patent: *Apr. 28, 2020

(54) METHODS FOR CREATING A SIMULATED WATERCOLOR-PAINTED IMAGE FROM A SOURCE IMAGE

(71) Applicant: John Balestrieri, Brooklyn, NY (US)

(72) Inventor: John Balestrieri, Brooklyn, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/992,476

(22) Filed: May 30, 2018

(65) Prior Publication Data

US 2018/0342085 A1 Nov. 29, 2018

Related U.S. Application Data

(63) Continuation of application No. 14/952,723, filed on Nov. 25, 2015, now Pat. No. 10,008,011.

(Continued)

(51) Int. Cl.
*G06T 11/00* (2006.01)
*G06T 5/00* (2006.01)
(Continued)

(52) U.S. Cl.
CPC .......... *G06T 11/001* (2013.01); *G06T 3/40* (2013.01); *G06T 5/002* (2013.01); *G06T 5/009* (2013.01); *G06T 5/40* (2013.01)

(58) Field of Classification Search
CPC ......... G06T 11/001; G06T 3/40; G06T 5/009; G06T 5/002; G06T 5/40
See application file for complete search history.

(56) References Cited

U.S. PATENT DOCUMENTS 4,189,743 A 2/1980 Schure
4,524,421 A 6/1985 Searby
(Continued)

FOREIGN PATENT DOCUMENTS

CN 102855647 1/2013
EP 2144200 7/2008
(Continued)

OTHER PUBLICATIONS

Patrick O'Brien, "A Framework for Digital Watercolor," Masters Thesis, Texas A & M University, Aug. 2008, pp. 1-56.
(Continued)

*Primary Examiner* — Yu Chen
(74) *Attorney, Agent, or Firm* — Thomas A. O'Rourke; Bodner & O'Rourke, LLP

(57) ABSTRACT

A method of creating watercolor images from a source image may include some or all of: scaling down and lightening the source image; converting the lightened image to a single channel grayscale image; blending a noise pattern with the lightened image to add random jitter; overlaying an edge detection map to produce an edge buffered control image; determining a main set of colors in the source image; determining boundaries for each region where the main set of colors appear; coloring in multiple passes using one color at a time, with a diffusion of water technique emulating wet-on-wet watercoloring; coloring each of the main set of colors, by coloring from a light to dark order; enhancing the edges of the regions to model the areas where a watercolor artist would maintain separation; and compositing to add sedimentation texture; flocculation texture; a drawing layer; and a paper texture pattern.

18 Claims, 8 Drawing Sheets

29 (Simulation Step #4)

Compositing to add-
Water Color Sedimentation Texture
Flocculation Texture
A Drawing Layer, and
A Paper Texture Pattern 31 (Final Watercolor Image)

Related U.S. Application Data

(60) Provisional application No. 62/084,790, filed on Nov. 26, 2014.

(51) Int. Cl.
   *G06T 3/40* (2006.01)
   *G06T 5/40* (2006.01)

(56) References Cited

U.S. PATENT DOCUMENTS

| | | | |
|---|---|---|---|
| 5,245,432 | A | 9/1993 | Jaffray |
| 5,347,620 | A | 9/1994 | Zimmer |
| 5,416,848 | A | 5/1995 | Young |
| 5,432,896 | A * | 7/1995 | Hwong ............... G06T 11/001 345/592 |
| 5,621,868 | A | 4/1997 | Mizutani |
| 5,828,819 | A | 10/1998 | Do |
| 5,844,565 | A | 12/1998 | Mizutani |
| 6,011,536 | A | 1/2000 | Hertzmann |
| 6,137,903 | A | 10/2000 | Dichter |
| 6,198,489 | B1 * | 3/2001 | Salesin ............... G06T 11/001 715/784 |
| 6,202,040 | B1 | 3/2001 | Schwiegerling |
| 6,268,865 | B1 | 7/2001 | Daniels |
| 6,619,860 | B1 | 9/2003 | Sijmon |
| 6,727,906 | B2 | 4/2004 | Lockeridge |
| 6,762,769 | B2 | 7/2004 | Guo |
| 8,219,370 | B1 | 7/2012 | DiVerdi |
| 8,296,668 | B1 * | 10/2012 | Song .................. G06F 3/0481 345/581 |
| 8,298,668 | B2 | 10/2012 | Song |
| 8,335,675 | B1 * | 12/2012 | DiVerdi ............... G06T 13/80 434/81 |
| 8,676,552 | B2 | 3/2014 | Mech |
| 9,142,056 | B1 | 9/2015 | Baran |
| 9,495,766 | B2 * | 11/2016 | Smolic ................ G06T 15/60 |
| 10,008,011 | B1 * | 6/2018 | Balestrieri ........... G06T 11/001 |
| 2005/0001854 | A1 * | 1/2005 | Schuster .............. G06T 11/001 345/639 |
| 2008/0266309 | A1 | 10/2008 | Sander |
| 2009/0009534 | A1 * | 1/2009 | Perani .................. G06T 3/40 345/665 |
| 2009/0028426 | A1 | 1/2009 | Maki |
| 2009/0157366 | A1 | 6/2009 | Shin |
| 2013/0127898 | A1 * | 5/2013 | DiVerdi ............... G06T 11/203 345/600 |
| 2013/0132053 | A1 | 5/2013 | Mech |
| 2013/0202204 | A1 | 8/2013 | Yamanaka |
| 2013/0329991 | A1 | 12/2013 | Nashizawa |
| 2014/0081610 | A1 * | 3/2014 | DiVerdi .............. G06F 3/03545 703/6 |
| 2014/0132619 | A1 | 5/2014 | Landsberger |
| 2014/0289663 | A1 | 9/2014 | Zhang |
| 2015/0310305 | A1 | 10/2015 | Fang |

FOREIGN PATENT DOCUMENTS

| | | |
|---|---|---|
| FR | 2933219 | 6/2008 |
| JP | 2003346171 | 5/2002 |

OTHER PUBLICATIONS

Victoria Interrante, "illustrating Surface Shape in Volume Data via Principle Direction-Driven 3D Line Intergal Convolution" SIGGRAPH 97 Conf. Proceedings, p. 109-116 Aug. 1997.

Eric B. Lum et al., "Non-Photorealistic Rendering using Watercolor Inspired Textures and Illumination," In Ninth Pacific Conf. on Computer Graphics & Applications, p. 322, 2001.

Aaron Hertzmann, "Painterly Rendering with Curved Brush Strokes of Multiple Sizes," Proc. ACM SigGraph, pp. 453-460. 1998.

Barbara J. Meier, "Painterly Rendering for Animation," SIGGRAPH 96 Conference Proceedings, pp. 477-484, Aug. 1996.

Thomas Luft et al,, Real-Time Watercolor Illustration of Plants Using a Blurred Depth Test Proceedings of the 4th int'l symp. on Nonphotorealistic animation & rendering 2006.

Thomas Luft and Oliver Deussen, "Interactive Watercolor Animations," Proc. Pacific Conf. Computer Graphics and Applications (PG '05), pp. 7-9, 2005.

Thomas Luft and Oliver Deussen, "Real-Time Watercolor for Animation," Journal of Computer Science and Technology 21, 2 (Mar. 2006), 159-165.

Harold Cohen, "The Further Exploits of AARON, Painter," Journal Stanford Humanities Review, vol. 4 Issue 2. Jul. 1995, pp. 141-158.

Aaron Hertzmann, Charles E. Jacobs, Nuria Oliver, Brian Curless, and David H> Salesin, "Image Analogies," SIGGRAPH 01, 2001.

Adrien Bousseau et al., "Interactive Watercolor Rendering with Temporal Coherence and Abstraction," Int. Symp. on Non-Photorealistic Animation and Rendering, 2006.

Nelson S. H. Chu and Chiew Lan Tai, MoXi: "Real Time Ink Dispersion in Absorbent Paper," ACM Trans. Graph. 24(3), 504-511 (2005).

Cassidy J. Curtis, Sean E. Anderson, Joshua E. Seims, Kurt W. Fleischer, David H. Salesin, "Computer-Generated Wateroolor,"SIGGRAPH 97, pp. 421-430, 1997.

Paul Kubelka and Franz Munk, "An Article on Optics of Paint Layers," In Z. tech Physik, vol. 12, 1931; 593-601.

Pedro F. Felzenzvvalb and David P. Huttenlocher, "Efficient Graph-Based Image Segmentation," International Journal of Computer Vision (2004) 59: 167.

David Cook, "Pixel Averaging Smooths Graphics Effects," Creative Computing, vol. 9, No. 1 / Jan. 1983 / p. 146.

Hyung W. Kang et al., "A Unified Scheme for Adaptive Stroke-Based Rendering," Aug. 23, 2006.

Miaoyi Wang et al., "Towards Photo Watercolorization with Artistic Versmiiitude," IEE Transactions on Visualization and Graphics, Jan. 2014.

Ren-Jie Wang et al., "Effective Wet-in-Wet Flow Synthesis for Ink Diffusion," Journal of Information Science and Engineering 26 1397-1411 (2010).

Patrick J. Doran et al., "Expressive Rendering with Watercolor," Master's thesis, Brown University (2013).

Mengmeng Zhang, "From Pixels to Region: A Salient Region Detection Algorithm for Location-Quantification Image," Mathematical Problems in Engineenng, Jan. 2014.

Ming-Ming Cheng et al., "Globat contrast Based Salient Region Detection," IEEE TPAMI, vol. 37, No. 3, pp. 569-582, 2015.

Charlotte Hoare, "Interactive Non-Photorealistic Rendering Using GLSL," Thesis submitted to Bournemouth University, Aug. 20, 2012.

E Lei et al., "Real-time Rendering of Watercolor Effects for Virtual Environments." Proc. Fifth Pacific Rim Conf. Advances in Multimedia Info, Processing, pp. 474-481, 2004.

Henry Johan et al., "Creating watercolor Style Images Taking Into Account Painting Techniques," J. Japan Soc Art Science, vol.. 3, No. 4, pp. 207-216, 2004.

Doug DeCarlo et al., "Stylization and Abstraction of Photographs," ACM Transactions on Graphics, 21(3), 769-776 (Proceedings of ACM SIGGRAPH 2002).

J. P. Collomosse et al., "Painterly Rendering Using Image Salience," In Proc. EGUK '02, 122-128.

Mingtian Zhao et al., "Customizing Painterly Rendering Styles Using Stroke Processes," In: Proc. NPAR, ACM; 2011, p. 137-146.

David Small, "Modeling Watercolor by Simulating Diffusion, Pigment, and Paper Fibers," Proceedings of SPIE '91 (Feb. 1991), pp. 70-76.

Jiajian Chen et al., "Watercolor Inspired Non-Photorealistic Rendering for Augmented Reality," Proceedings of ACM symp. on Virtual reality software and technology 2008.

Kun Zeng, "From Image Parsing to Painterly Rendering," ACM Transactions on Graphics, vol. 29, No. 1, Article 2, Dec. 2009.

Paul Harberli, "Paint by Numbers: Abstract Image Representations," Computer Graphics (SIGGRAPH '90 Proceedings), vol. 24, pp. 207-214, Aug. 1990.

Peter Litwinowicz, "Processing Images and Video for an Impressionist Effect," Proceedings of SIGGRAPH 97, pp. 407-414.

(56) References Cited

OTHER PUBLICATIONS

Narendra Abuja, "A Transform for Multiscale Image Segmentation by Integrated Edge and Region Detection," PAMI, 18(12), 1996.
Michio Shiraishi at al., "An Algorithm for Automatic Painterly Rendering Based on Local Source Image Approximation," Proc. of First Int'l Symp. on Non-photorealistic Animation and Rendering (NPAR), 53-58, 2000, year 2000.
Jessica Stacy Scott, "GPU Programming for Real-Time Watercolor Simulation," Dec. 2004, A Thesis Submitted to the Office of Graduate Studies of Texas A&M University.
Tom Van Laerhoven et al., "Real-time Watercolor Painting on a Distributed Paper Model," Proceedings of Computer Graphics International 2004, 640-643.
Patrick O'Brien, A Framework for Digital Watercolor, Masters Thesis, Texas A & M University, 2008.
Victoria Interrante, Illustrating Surface Shape in Volume Data via Principle Direction-Driven 3D Line Intergal Convolution, 1997.
Eric B. Lum and Kwan-Liu Ma, Non-Photorealistic Rendering using Watercolor Inspired Textures and Illumination, 2001.
Aaron Hertzmann, Painterly Rendering with Curved Brush Strokes of Multiple Sizes, Dept. of Computer Science, NYU, 1998.
Barbara J. Meier, Painterly Rendering for Animation, 1996.
Thomas Luft and Oliver Deussen, Real-Time Watercolor Illustration of Plants Using a Blurred Depth Test, 2006.
Thomas Luft and Oliver Deussen, Interactive Watercolor Animations, 2005.
Thomas Luft and Oliver Deussen, Real-Time Watercolor for Animation, 2006.
Harold Cohen, THe Further Exploits of AARON, Painter, 1995.
Aaron Hertzmann, Charles E. Jacobs, Nuria Oliver, Brian Curless, and David H> Salesin, Image Analogies, 2001.
Adrien Bousseau, Matt Kaplan, Joelle Thollot, and Francois X. Sillion, Interactive Watercolor Rendering with Temporal Coherence and Abstraction, 2006.
Nelson S. H. Chu and Chiew Lan Tai, MoXi; Real Time ink Dispersion in Absorbent Paper, 2005.
Cassidy J. Curtis, Sean E. Anderson, Joshua E. Seims, Kurt W. Fleischer, David H. Salesin, Computer-Generated Watercolor, 1997.
Paul Kubelka and Franz Munk, An Article on Optics of Paint Layers, 1937.
Pedro F. Felzenzwalb and David P. Huttenlocher, "Efficient Graph-Based Image Segmentation", 2004.
David Cook, "Pixel Averaging SmoothesGraptiics Effects", 1983.

\* cited by examiner

METHODS FOR CREATING A SIMULATED WATERCOLOR-PAINTED IMAGE FROM A SOURCE IMAGE

CROSS REFERENCES TO RELATED APPLICATIONS

This application is a continuation of U.S. patent application Ser. No. 14/952,723, filed on Nov. 25, 2015, which claims priority on U.S. Provisional Application Ser. No. 62/084,790, filed on Nov. 26, 2014, the disclosures of which are incorporated herein by reference. This application incorporates by reference the disclosures of the Applicant's U.S. patent application Ser. No. 14/250,475, filed on Apr. 11, 2014, now issued as U.S. Pat. No. 9,478,004, having the title, "Method and System for Analog/Digital Image Simplification and Stylization."

FIELD OF THE INVENTION

The present invention relates to a computer-implemented process for modifying a source image, and more particularly to a process for simulating an artist's redrawing technique for creating a digital watercolor image from a source image.

BACKGROUND OF THE INVENTION

The practice of painting images dates back over 30,000 years, as shown by the prehistoric cave paintings discovered in many parts of the world, including Africa, Australia, and Europe (e.g., the Chauvet-Pont-d'Arc Cave in the south of France). The Greeks and Romans painted on wood panels—a practice that continued until the use of canvas became widespread, during the Renaissance period, particularly during the early $16^{th}$ century.

Watercolor painting involves the use of semi-transparent pigments rather than the mostly opaque acrylic- and oil-based paints, but is considered to be just as old. However, watercolor painting did not become firmly established as an art medium until the Renaissance. The practice was prominently used for botanical and wildlife illustrations on woodblock, vellum, and paper. Watercolor paintings were eventually used for mapmaking around the time when the practice proliferated during the $18^{th}$ century, which was particularly the result of the works of several English artists. The most notable watercolor painters of that period are perhaps Paul Sandby, who became known as the "father of English watercolor," Thomas Girtin, for his landscape paintings, and Joseph William Mallard Turner, who is credited as developing the watercolor painting technique of painting in stages, and of refining an image through a sequence of washes and glazes. Later artists such as John Constable and David Cox are credited as developing the techniques of wiping and scratching out the colors.

Today's artist uses watercolor paints that are a combination of pigments ground into small particles to provide the color, a natural gum arabic or synthetic glycol binder that is used to suspend the pigment, but which permits it to adhere to the paper, various other additives (e.g., a surfactant to reduce surface tension of the liquid to permit it to soak into the paper), and a solvent (i.e., water), which evaporates as the paint dries.

Today's artist also uses paper that is particularly manufactured for such applications, and may be made of wood pulp, at the low end, or from cotton or linen at the high. The fibers of the paper are porous and very absorbent, so the paper is usually lightly treated with sizing (e.g., cellulose), to slow the absorption of the paint, but which may nonetheless permit the pigment granules to penetrate, depending upon the grain size. The ability of certain pigment granules to separate from the binder and settle into valleys within the paper to produce a grainy texture, when dry, is known as granulation. Also, some pigments (e.g., lapis, lazuli, and ultramarine) exhibit certain electrical properties giving them the tendency to be drawn towards each other to form clumps on the paper, to provide a similar grainy texture or speckling known as flocculation.

Watercolor painting is unlike painting with acrylic or oil based paints, which stay as they are laid, as watercolor paints, conversely, are more active, and require knowledge of its behavior. There are two basic techniques for watercolor painting, which are known as wet-on-dry and wet-on-wet painting. With the wet-on-dry technique, the brush applies the watercolor paint onto a dry paper, whereas for the wet-on-wet technique, the paint is applied to a region of paper that had already been saturated with water or watercolor paint. There are a multitude of further delineated techniques, many of which are used only with respect to wet-on-wet applications, each of which produce particular effects. Some of these further techniques are known as back-runs, paint diffusion, pouring color, dropping in color, salt texturing, cling-film, drybrush, edge darkening, etc.

Because of the popularity of the unique effects produced by the various watercolor painting techniques, there has been substantial interest in converting a source image of various different kinds (e.g., an original oil painting, a digital photograph, etc.), into a watercolor painting. This conversion had been done manually by artists, but with the ability to digitize an image and manipulate it using a computer system, methods for digitally converting source images have also arisen. These methods exhibit varying levels of success at realistically mimicking painterly effects to create a realistic simulated Watercolor image. The present invention is directed to a process that converts a source image into a simulated watercolor-painted image to more closely resemble the techniques and realism achieved when an artist manually creates the painting using watercolor paints on paper, and which may run efficiently on different devices and architectures, particularly low-power mobile devices.

OBJECTS OF THE INVENTION

It is an object of the invention to provide a process for converting a source image into a simulated watercoior-painted image.

It is another object of the invention to provide a process for converting a source image into a simulated watercolor-painted image that is created in a similar fashion to the way an artist would manually paint the image from scratch using watercolor paints on paper.

It is a further object of the invention to provide a process for converting a source image into a simulated watercolor-painted image that can run efficiently on different devices and architectures, especially low-power mobile devices.

Further objects and advantages of the invention will become apparent from, the following description and claims, and from the accompanying drawings.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to method steps, a portion of which or all of which may be used to process a source image, to make the image appear like a watercolor painting.

The image processing pipeline includes a combination of image processing filters and compositing steps, and includes a unique pigment propagation stage. The pigment propagation stage simulates the spread of pigment through wet paper.

The simulation is empirical it is controlled by numeric parameters and input images.

The simulation is an approximation, which reduces the process to a set of steps that can run efficiently on different computing devices and architectures, particularly low-power mobile devices, and may utilize both an edge buffer and a pigment propagation buffer.

The herein disclosed methods for creating a simulated watercolor-painted image from a source image may begin by inputting the source image into the system.

To create an edge buffer, the source image may first be scaled down, because the size of the source image will affect the size of the pigment propagation stage.

Next, the scaled-down version of the source image may be gamma adjusted to be lighter. This may done for two reasons: first, empirically, watercolor images are lighter and brighter than photographic images; and second, the pigment propagation stage may simulate a subtractive color model, in which, as colors bleed and mix, they become darker.

Next, an edge buffer may be created. There are 3 main steps used to create the edge buffer. A base image—the scaled-down and lightened version of the source image—is first converted to a single-channel grayscale image. In the second step, a noise pattern is blended with the gray scale image, which adds random jitter that simulates the randomness of paper fibers, and may be used to affect the subsequent spread of pigment when running the herein disclosed pigment propagation stage. Finally, a special edge detection map is overlaid onto the jitter-blended grayscale image to create the edge buffer, which is used to enforce very high barriers that the kernel in the pigment propagation stage will not cross. This simulates the artist's technique of leaving white gaps between regions that the artist does not want to blend, because the pigment propagation stage may treat the entire image surface as 'wet' and potentially blendable, which in watercolor paintings is known as the wet-on-wet painting technique.

To create the pigment propagation buffer, which may be the same size as the edge buffer, the scaled down and lightened version of the source image from above may be utilized. An image segmentation algorithm is run on the scaled down and lightened source image, which may operate to create regions of similar color. Although the pigment propagation stage can use any color source for the pigment buffer, the herein disclosed process preferably deposits pigments in stages, using the pigment buffer, to simulate an artist's painting process. Segmented regions are used to create clusters of colors that will eventually be copied to the pigment buffer over time.

Thereafter, the color regions axe sorted by color value (lightest to darkest), which will become the order by which they will be deposited by the algorithm into the pigment buffer, and will subsequently be utilized thereafter, because when painting wet-on-wet, artists will generally start with the lightest colors and end with the darkest. This prevents dark areas of paint from bleeding for too long, which may ruin lighter areas of the painting that are supposed to remain light.

The edge delineation map from the previous step is also used, to ensure that no pigment is placed near edges that have been deemed to be cleanly delineated.

Next, the pigment propagation stage can begin. The pigment propagation stage operates to deposit each of the regions of color that were detected by the image segmentation algorithm. The pigment propagation stage deposits the colors in multiple passes, depositing only one color at a time, in each of the passes, using the detected colors and the region boundaries that were sequentially stored in the pigment buffer. The simulation uses a diffusion of water technique that emulates wet-on-wet watercoloring. So, the pigment propagation, stage operates to deposit the regions of color, with a darkening only color diffusion, with the order of color deposition going from the lightest colors to the darkest colors (i.e., the color value order of the pigment propagation buffer), while nonetheless enforcing each of the strict edge boundaries within the edge buffer.

The output of pigment propagation stage is then sent through several compositing stages, which may add watercolor sedimentation and flocculation textures that may be created by scanning real watercolor surfaces and/or generated with synthetic noise algorithms, and alpha blending them therewith. Additionally, a drawing layer may be composited therewith, as well as a paper texture pattern.

In summary, the process may be succinctly described as including some or all of the following steps (note that some steps may optionally be performed to provide desired effects or results):

inputting a source image;

identifying areas of importance within the source image (e.g., faces of people); which areas receive a sharpening pass that create boundaries of increased contrast, making it difficult for pigment to cross over in the coloring . . .

scaling the source image; i.e., upscaling (interpolated-information is added) or downscaling (information is discarded)

adjusting the luminance values for lightening of the scaled down image; e.g., linear (histogram scaling and shifting) and non-linear adjustments (screen blend with the source and destination images being the same image), or gamma adjustments . . .

converting the lightened image to a single channel grayscale image;

blending a noise pattern with the grayscale image to add random jitter to simulate the randomness of paper fibers;

overlaying an edge detection map to produce an edge buffered control image;

determining a set of different colors used in the source image;

determining boundaries for each region where each of the colors of the set of colors appear, sorting the color regions according to color value, and storing the ordered colors and color boundaries in a pigment buffer;

pixel averaging by computing the weighted mean of each neighbor pixel; which may be for example, as disclosed in "Pixel Averaging Smooth Graphics Effects," by David Cook, the disclosures of which are incorporated herein by reference.

coloring one color at a time in multiple passes, using the ordered set of colors and region boundaries in the pigment buffer, in a diffusion of water technique emulating wet-on-wet watercoloring; i.e., simulating the artistic process of layering (placing wet colors on top of dry colors) by compositing independent runs, or, simulating the artistic process of placing wet colors next to dry colors so they don't bleed by using a new buffer that controls the strength of the herein disclosed coloring effect (pigment propagation stage) at each pixel, e.g., dry pixels are not written to or read from . . .

coloring each of the colors of the set of colors, with a darkening only color diffusion, by coloring from a light to dark order, using the color order of the pigment buffer;

using the edge buffered control image tor each coloring pass to control the diffusion geometry for the regions but not the color;

adjust the lightness of the colored image for aesthetic reasons;

running a convolution filter similar to the unsharp-mask of application Ser. No. 14/250,475, but which only darkens edge regions, to simulate the effect of pigment particles traveling to the edge of wet pools as they are evaporating;

compositing to add sedimentation texture;

compositing to add flocculation texture;

compositing to add a paper texture pattern; and compositing to add a drawing layer.

BRIEF DESCRIPTION OF THE DRAWINGS

The description of the various example embodiments is explained in conjunction with the appended drawings, in which.

DETAILED DESCRIPTION OF THE INVENTION

As used throughout this application, the word "may" is used in a permissive sense (i.e., meaning having the potential to), rather than the mandatory sense (i.e., meaning must). Similarly, the words "include", "including", and "includes" mean including but not limited to.

The phrases "at least one", "one or more", and "and/or" are open-ended expressions that are both conjunctive and disjunctive in operation. For example, each of the expressions "at least one of A, B and C", "one or more of A, B, and C", and "A, B, and/or C" means A alone, B alone, C alone, A and B together, A and C together, B and C together, or A, B and C together.

Furthermore, the described features, advantages, and characteristics of any particular embodiment disclosed in the following specification, may be combined in any suitable manner with any of the other embodiments disclosed herein.

The present invention is directed to method steps, a portion of which or all of which may be used to process a source image, to make the image appear like a watercolor painting.

The herein disclosed methods tor creating a simulated watercolor-painted image from a source image may begin by inputting the source image into the system, such as source image 11 shown in FIG. 1, and by Identifying areas of importance within the source image (e.g., faces of people), which areas may receive a sharpening pass that create boundaries of increased contrast, making it difficult for pigment to cross over, during the coloring stage described hereinafter.

Figure 1:
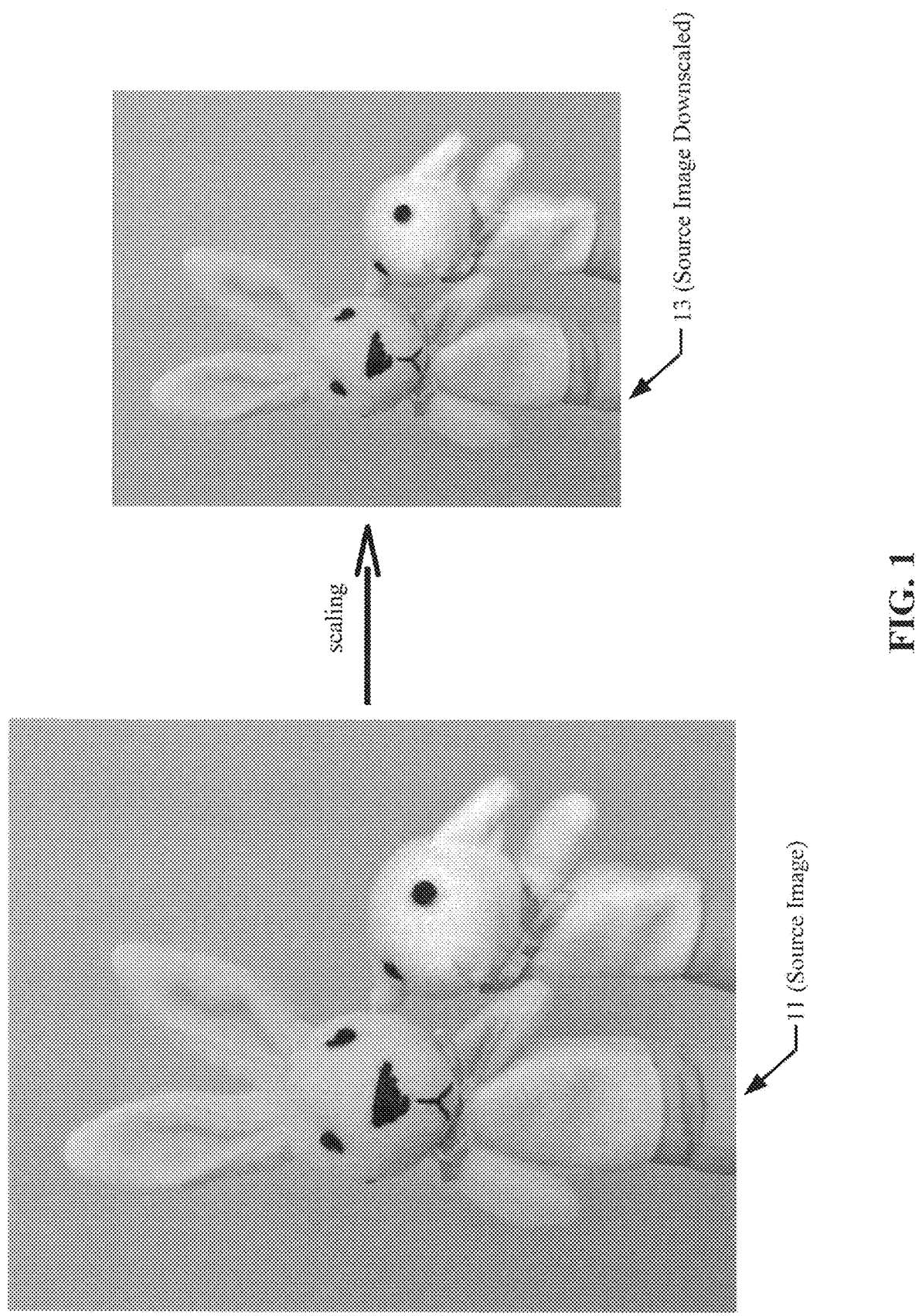
FIG. 1 illustrates a source image being scaled down for use in creating a simulated watercolor-painted image, after being input into the system.

The source image 11 may next be "scaled," which is symbolically shown for image 13 in FIG. 1 by physically reducing the image size. However, "scaling" of the image herein actually involves either downscaling of the image where certain information is discarded, or upscaling of the image where information is added. Of course, the processing may proceed without such sealing of the source image. However, the source image may preferably be downscaled, because the size of the source image will affect the size of the pigment propagation stage, because the pigment propagation stage works with cells that correspond to the pixels in the source image. Using more cells in the pigment propagation stage requires more computational power.

With downscaling, certain information is discarded—particularly such information that an artist would ignore. For example, most artists painting a portrait would not paint the pores in the person's face, therefore, the algorithm of the present invention throws out this very high frequency information (i.e., high frequency information that may exceed a threshold). When such information is retained, it may create an artistic effect that is realistic; conversely, when such information is discarded (by down scaling) it may create an artistic effect that is more "impressionistic." The image may also be down-scaled so that it may run in a reasonable amount of time on whatever platform the algorithm may be implemented on by the user—which platform may not have much computational power.

Figure 2:
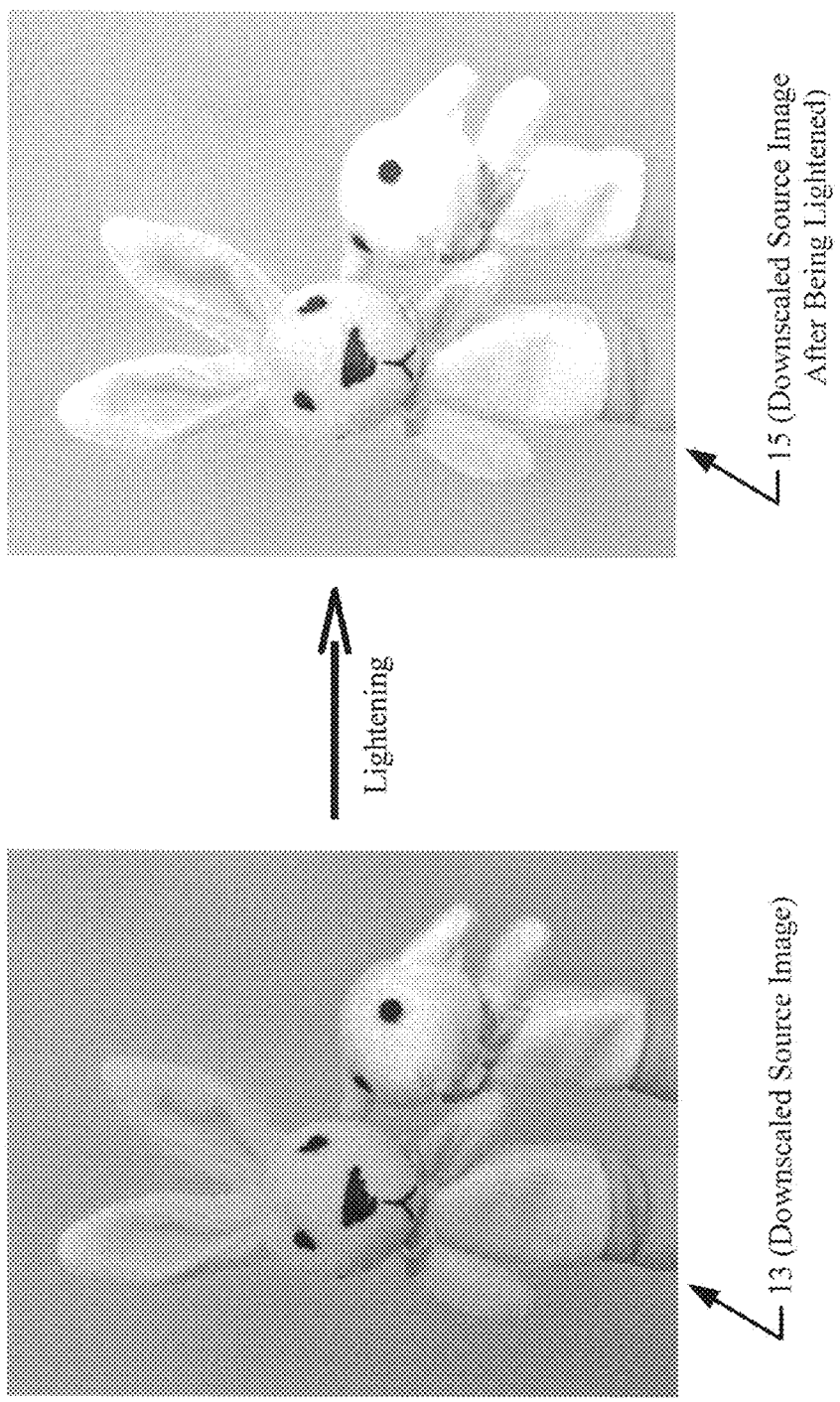
FIG. 2 illustrates gamma adjusting of the scaled-down source image of FIG. 1, to produce a lighter version thereof.

Next, the scaled version 13 of the source image 11 may be adjusted to be lighter, to be as shown for image 15 in FIG. 2. This lightening may broadly include doing linear (histogram scaling and shifting) and/or non-linear adjustments (screen blending with the source and destination images being the same image). In an alternate embodiment, the algorithm may accomplish lightening by gamma adjusting the source image, which involves applying a logarithmic adjustment (i.e., $V_{out}=(V_{in})*$) to the luminance values for the image.

This lightening may performed for two reasons: first, empirically, watercolor images are lighter and brighter than photographic images; and second, the pigment propagation stage disclosed hereinafter may simulate a subtractive color model, in which, as colors bleed and mix, they become darker. Note that with a subtractive color model, a limited number of colors—paint pigments—are mixed to create additional colors, each being created by partially or completely subtracting (i.e., absorbing) some wavelengths of light and not others. For example, the primary subtractive colors are cyan, magenta, and yellow.

Figure 3:
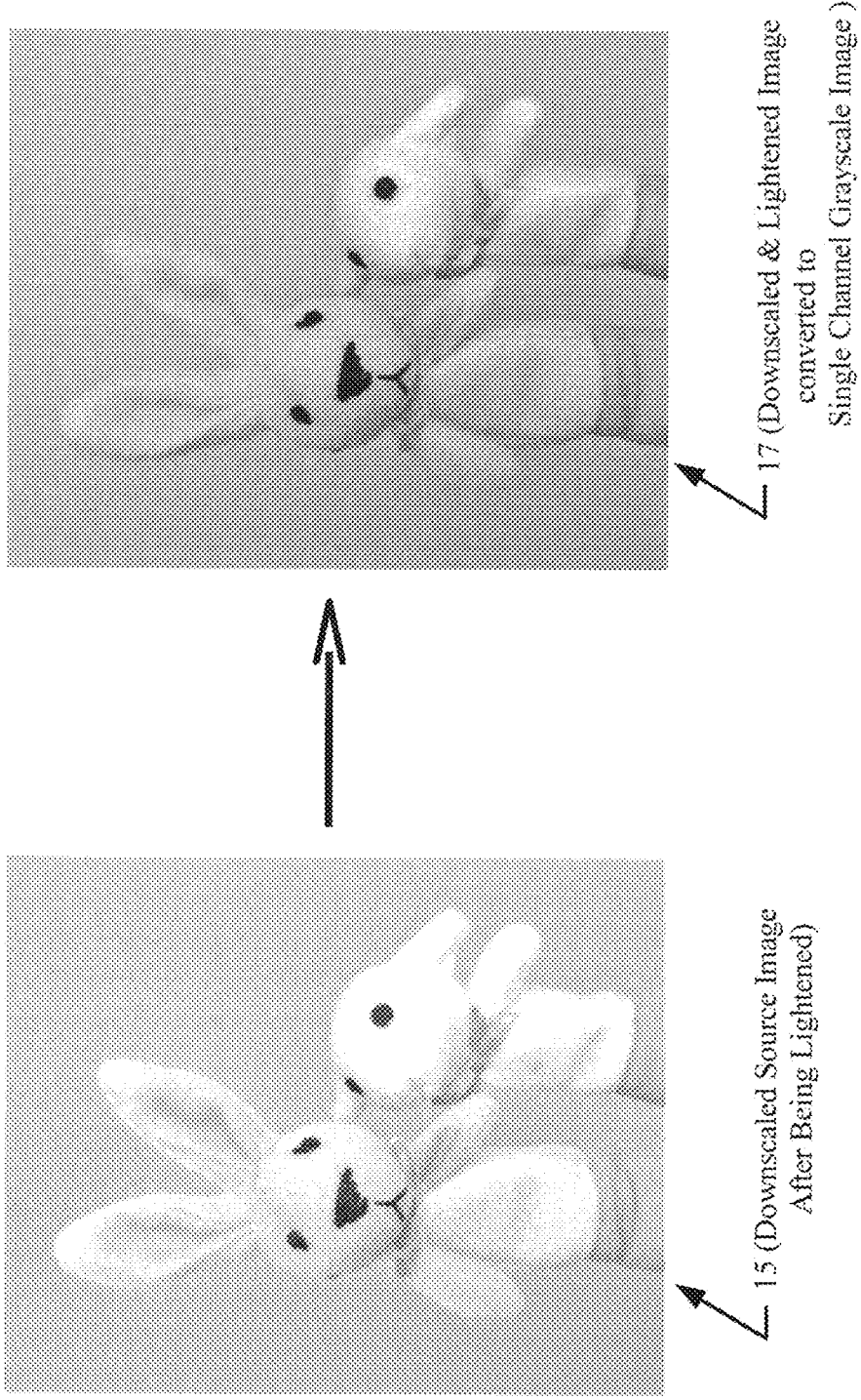
FIG. 3 illustrates converting the gamma adjusted, scaled-down version of the source image into a single channel grayscale image.

Next, an edge buffer image 21 may be created. There are 3 main steps used to create the edge buffer image 21. A base image—the scaled-down and lightened image 11 made from the source image 11—is first converted to a single-channel grayscale image 17, as seen in FIG. 3. In the second step, a noise pattern is blended with the grayscale image 17, which adds random jitter that simulates the randomness of paper fibers, and may be used to affect the subsequent spread of pigment when running the herein disclosed pigment propagation stage. The noise can be synthetic (i.e., generated by computer), or it may instead be derived from digitizing real textures (e.g., digitizing sandpaper, paper, etc.). A particular noise pattern may be used to provide a specific effect—evenly distributed noise creates randomly dispersed pigment, whereas noise patterns with strong direction gradient (e.g., wood grain) will distribute pigment in the direction of the "grain." It is also advantageous to composite various synthetic noise algorithms, such as Perlin noise algorithm and Gaussian noise to create textures that look like watercolor sedimentation/flocculation effects, where it is difficult to obtain these effects from scans of real watercolor surfaces. Creating the textures synthetically also allows for much more precise control in achieving the desired effect than using real paint because all the factors in real watercolor painting can't be precisely controlled (paper density, ambient humidity, etc.).

Finally, a special edge detection map 19 is overlaid onto the jitter-blended grayscale image to create the edge buffer image 21, which may be used to enforce very high barriers that the kernel in the pigment propagation stage will not cross. This simulates the artist's technique of leaving white gaps between regions that the artist does not want to blend, because the pigment propagation stage may treat the entire image surface as 'wet' and potentially blendable, which in watercolor paintings is known as the wet-on-wet painting technique. The edge detection map 19 may be created by the process disclosed in the Applicant's co-pending application Ser. No. 14/250,475 using a difference of Gaussians process, where two images are convolved with blurs of different radii and then subtracted, leaving information that falls between a range of spatial frequency values.

To create the pigment propagation buffer, which may be the same size as the edge buffer, the scaled down and lightened image 15 made from the source image 11 from above may be utilized. An image segmentation algorithm is run on the sealed and lightened source image 15, which may operate to create regions of similar color. The herein disclosed process preferably deposits pigments in stages, using the pigment buffer, to simulate an artist's painting process. Segmented regions are used to create clusters of colors that will eventually be copied to the pigment buffer over time.

The image segmentation algorithm may be a graph-based segmentation algorithm. The algorithm may be as described in "Efficient Graph-Based Image Segmentation" by Pedro F. Felzenszwalb, the disclosures of which are incorporated herein by reference. Various artistic effects can be achieved with different segmentation algorithms. For example, the image segmentation algorithm utilized herein may allow for a 'minimum segmented region size' so that the image may be further simplified (e.g., discarding regions below the minimum size). Alternatively, the segmentation algorithm used may not require a 'min segmented region size' because the desired effect is for more detail in the painted image. The algorithm utilized herein may also permit specifying the 'color similarity' required for forming of the regions (e.g., the algorithm may form a plurality of color regions that have certain threshold boundaries, within which the color, and potentially the size, of a scanned portion of the image must fail for it to be grouped within one of those regions).

Also, a watershed segmentation algorithm may alternatively be used instead of an image segmentation algorithm. Additionally, segmentation can of course be created by hand, similar to the way an artist generally colorizes regions.

Thereafter, the color regions are sorted by color value (lightest to darkest), which will become the order by which they will be deposited by the algorithm into the pigment buffer, and will subsequently be utilized thereafter, because when painting wet-on-wet, artists will generally start with the lightest colors and end with the darkest. This prevents dark areas of paint from bleeding for too long, which may ruin lighter areas of the painting that are supposed to remain light.

The edge detection map 19 from the previous step is also incorporated into the pigment buffer, to ensure that no pigment is placed near edges that have been deemed to be cleanly delineated. The edge areas in the map are used to remove color from the pigment buffer (i.e., colors within the edge areas are replaced with white, and when the colors are sorted, the white colors are the first added to the painting, but the effect is 'null' because it is the lightest color).

Next, the pigment propagation stage can begin. The pigment propagation stage operates to deposit each of the regions of color that were detected by the image segmentation algorithm. The pigment propagation stage deposits the colors in multiple passes, depositing only one color at a time, in each of the passes, using the detected colors and the region boundaries that were sequentially stored in the pigment buffer. The simulation uses a diffusion of water technique that emulates wet-on-wet watercoloring. So, the pigment propagation stage operates to deposit the regions of color, with a darkening only color diffusion, with the order of color deposition going from the lightest colors to the darkest colors (i.e., the color value order of the pigment propagation buffer), while nonetheless enforcing each of the strict edge boundaries in accordance with the edge map. Since the pigment propagation stage operates with a darkening-only methodology, the darker colors overwrite the white areas.

Figure 4:
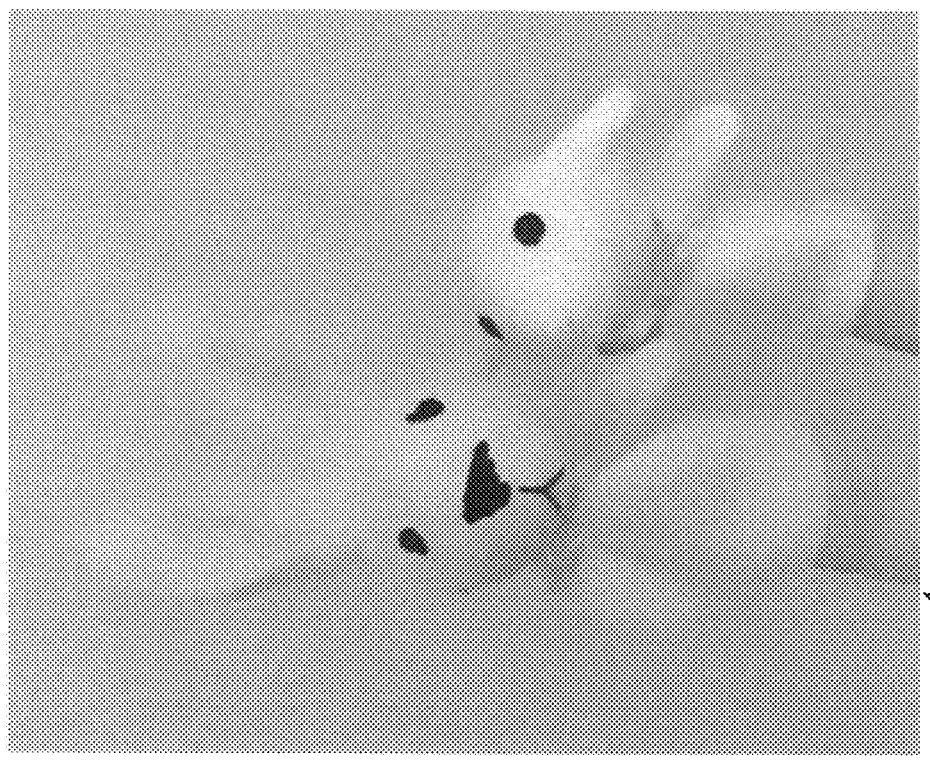
FIG. 4 illustrates the prior art conversion of a single channel grayscale image, using a bi-lateral filter, into a blurred image.
Figure 4:
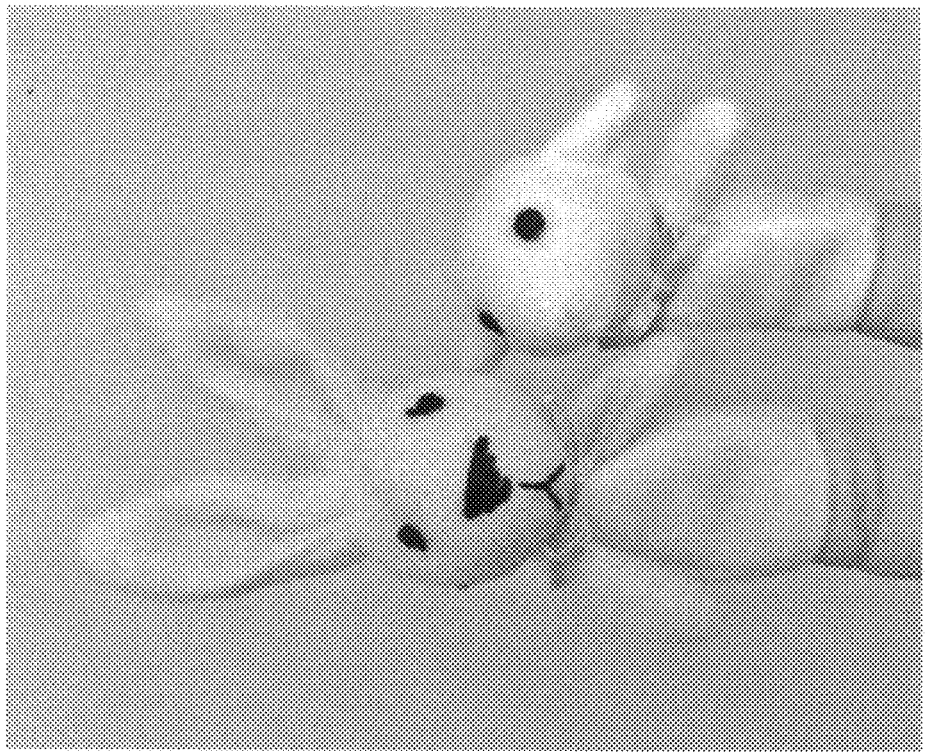
Figure 5:
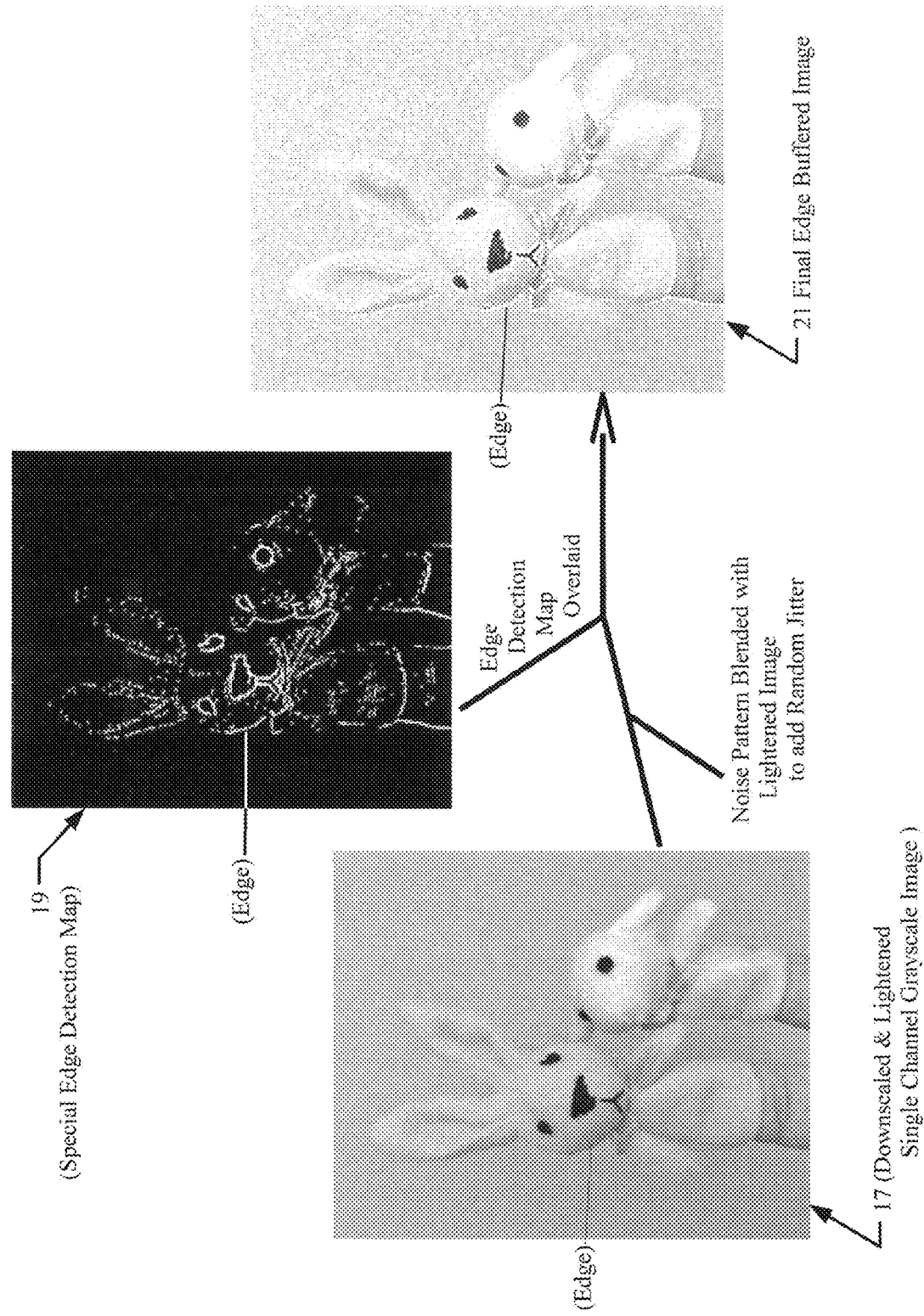
FIG. 5 illustrates converting of the grayscale image of FIG. 3 into an Edge Buffered Image according to the present invention, using a noise pattern blended with the grayscale image, and using an edge detection may that is overlaid onto the blended grayscale image.

The pigment propagation stage operates analogously to a prior art bilateral filter, an example of which is shown in FIG. 4, operating therein on a single channel grayscale image, which produces the bilateral blurred image. Implementations of this type of filter can be very simple, e.g., a 3×3 cross filter applied repeatedly to the source image, and with the intensity controlled by repeated application of the filter, with the output of each pass being used as the input to the next pass.

However, watercolor simulation produced by the pigment propagation stage herein adds a unique twist: the output buffer of the bilateral filter is not based on values read from the input buffer. Instead, two separately maintained buffers of identical size are used—the Edge Buffer and a Pigment Buffer.

The Edge Buffer is utilized and is never altered, it is maintains a read-only status throughout subsequent executions of the filter.

The color values of the Pigment Buffer are read as input and written as output, based on corresponding pixels in the Edge Buffer. For each pixel, the bilateral filter calculates the contribution of its adjacent neighbor pixels, then uses these values to read a fraction of the adjacent neighbor pixels from the Pigment Buffer and computes the final pixel value as an average of its weighted neighbors. (See e.g., "Pixel Averaging Smooth Graphics Effects," by David Cook, the disclosures of which are incorporated herein by reference). However, the final pixel values are written using a mint) test that only changes the pixel value if the computed value is darker than the previous value at that pixel.

The Pigment Buffer starts out with each pixel at maximum value and pigment values are written to the Pigment Buffer before the simulation begins. This results in darker values spreading across the Pigment Buffer. When the Pigment Buffer is composed of 3 RGB channels it gives the appearance of color blending. (The method is simulating the subtractive color model of real pigments using an RGB (additive color model) buffer by using the mathematical Min( ) function during iterations of the within the pigment propagation stage(s) to make the output pigment buffer grow progressively darker by only writing values that are darker than what was there previously).

Therefore, the pigment propagation stage runs a simple cross filter repeated on the Pigment Buffer, spreading darker values during each pass. This filter is designed to be implemented on a parallel system, with its implementation using an OpenGL fragment shader to run each pass in parallel, hundreds of times.

Figure 6:
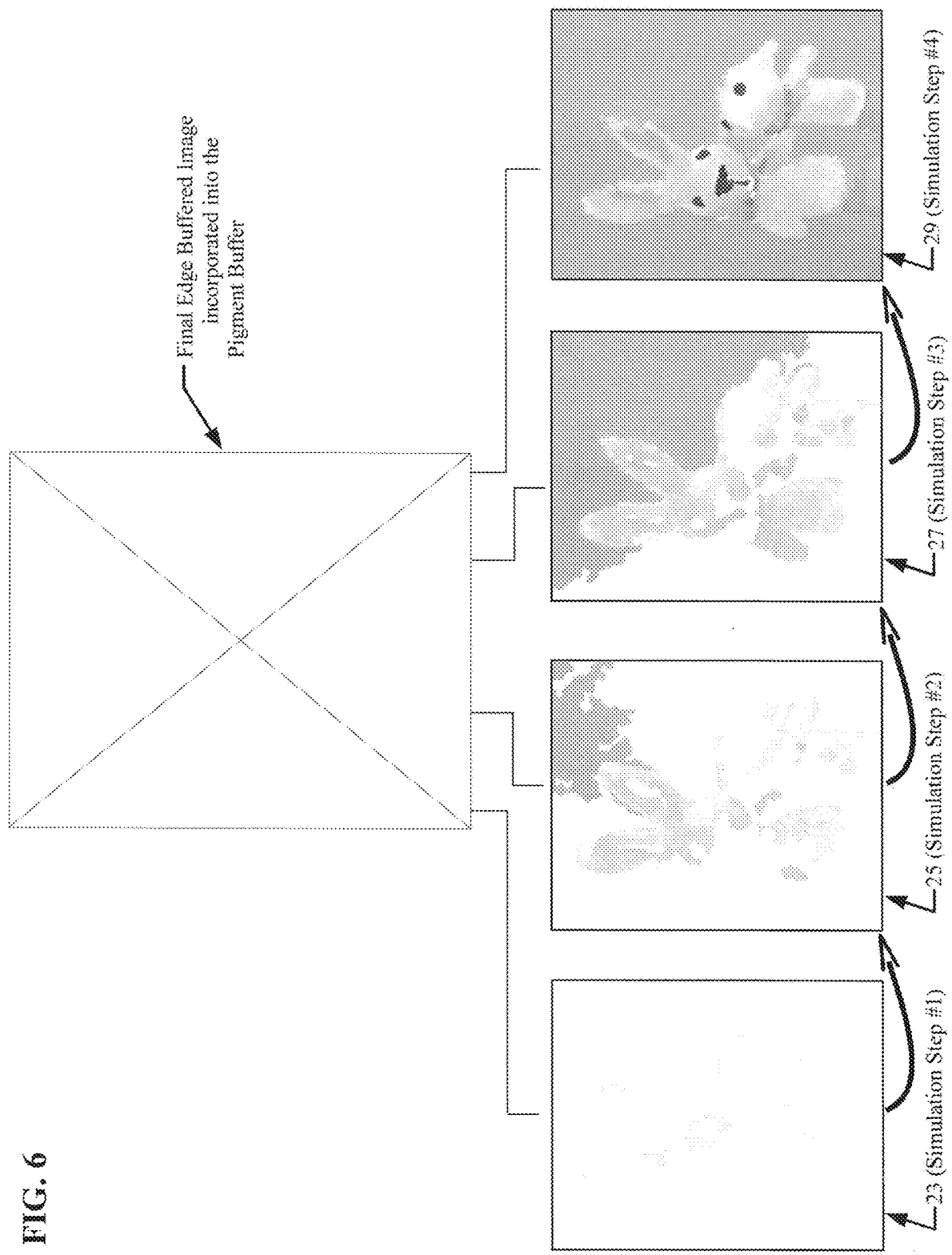
FIG. 6 illustrates, the pigment propagation stage of the simulation, in which coloring occurs one color at a time, in multiple passes, based on the pigment buffer, with the edges enforced in accordance with the edge buffer.

As seen in FIG. 6 for the iterative steps 23, 25, 27, and 29, these frames show aggregate steps of color deposition. For computational efficiently, the depositing of color may be batched and a bunch of colors may be deposited in one step, e.g., depositing the first 50 lightest color regions, then the next 50 regions, etc. With either method of deposition (i.e., individual color deposition or batch deposition), the simulation may progress at a desired rate to produce a desired visual effect: the user "sees the image being painted" in front of them ( on screen) and can watch the painting progress and the progression of the color bleeding effects, which users may find visually-interesting.

The output image 29 of pigment propagation stage is then sent through several compositing stages, which may add watercolor sedimentation (e.g., using a map consisting of mainly low-frequency noise) and flocculation textures (e.g., using a map consisting of mainly high-frequency noise), which may be created by scanning real watercolor surfaces and/or generated with synthetic noise algorithms, and alpha blending them therewith. (Note, alpha blending is a process that combines an image with a background to communicate the transparency of a surface). The scanned watercolor images used for the maps may be large areas of watercolor paintings that were particularly painted as evenly as possible, and were then used for creating a repeating pattern of the texture. Color is removed to create a single channel image that is combined with the output pigment buffer to take on the colors from the pigment output buffer. A library of different paper/sedimentation/flocculation textures is created to simulate different paper effects.

Additionally, a paper texture pattern may be composited therewith, to produce the final image 31.

Also, a drawing layer may be composited therewith, which drawing layer may be in accordance with the "detail bandpass map" and "post-process for detail reduction" step of the Applicant's co-pending application Ser. No. 14/250, 475. The drawing layer may then further post-processed, to simulate pencil, pen, etc.

Figure 7:
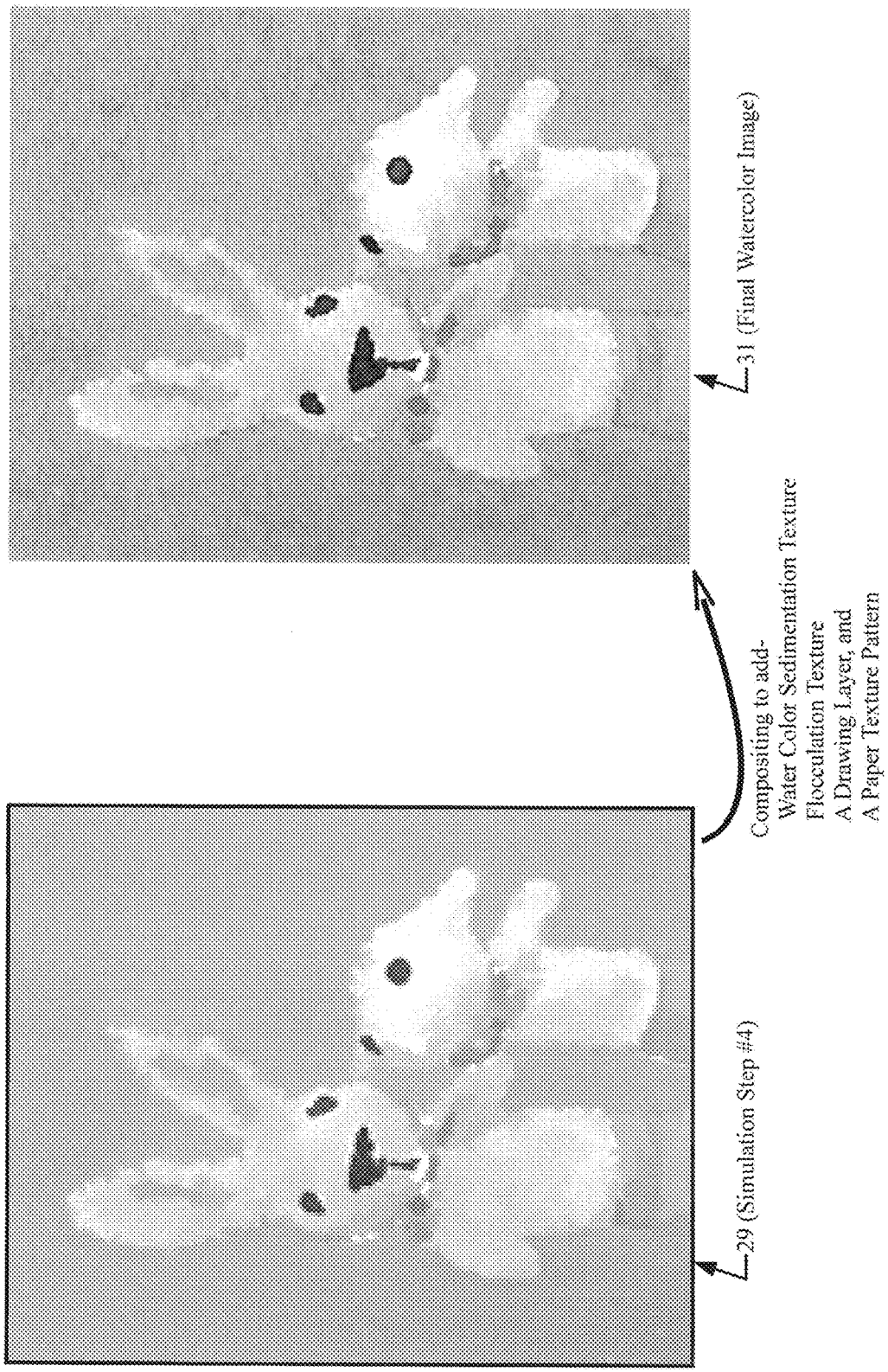
FIG. 7 illustrates compositing of the image resulting from the pigment propagation stage of FIG. 6, with sedimentation texture, with flocculation texture, with a drawing layer, and with a paper texture pattern.
Figure 8:
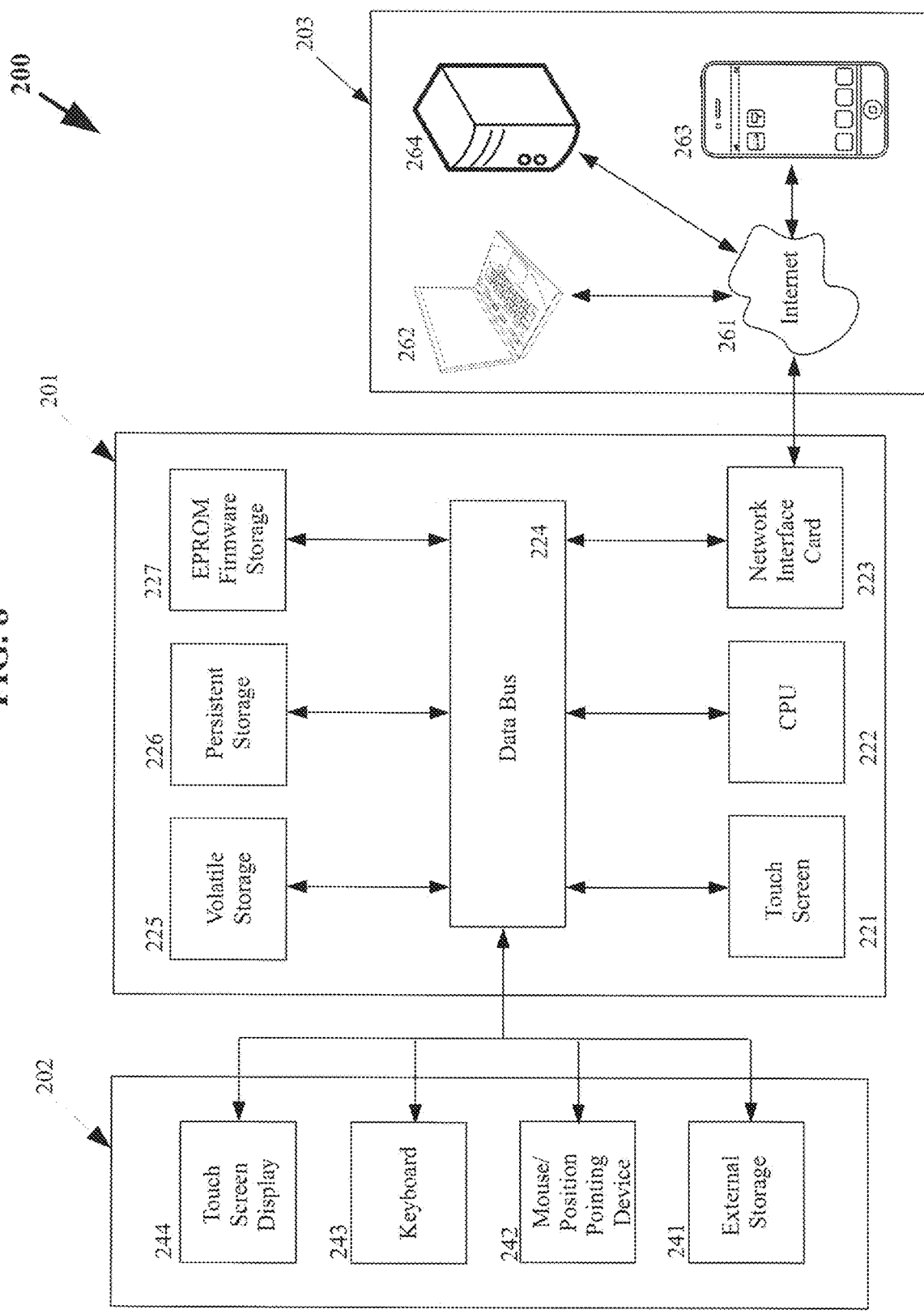
FIG. 8 is a schematic illustration showing an exemplary computing unit capable of being programmed by the instructions of the software of the present invention, and which may include personal computers, cellular phones, and other mobile devices.

Software of the present invention may ran on a suitable computing device, such as a server, a tablet, a cell phone, or other mobile smart device, so a description of such an accessorized exemplary computer system is hereinafter disclosed, even though a particular embodiment may not require the described components. Exemplary computer system 200 (i.e., a client device associated with a particular user) is shown schematically in FIG. 7, and which may comprise computing unit 201 that may interact with external peripherals 202, such as a separate touch screen display 244, and may interact with network resources 203, including use of the internet 261, and other computers (or other client devices or a server), which may be a laptop computer 262 (i.e., a second client device associated with a second user), a smart phone 263 (i.e., a third client device associated with a third user), a server 264, etc.

The computing unit 201 may include a data bus 224 for communicating information across and among various parts of computing unit 201, and a central processing unit, which may be a microprocessor (hereinafter "processor" or "CPU") 222 coupled with a bus 224 for processing information and performing other computational and control tasks. Computing unit 201 may also include a volatile storage 225, such as a random access memory (RAM) or other dynamic storage device, coupled to bus 224 for storing various information as well as instructions to be executed by processor 222. The volatile storage 225 may also be used for storing temporary variables or other intermediate information during execution of instructions by processor 222. Computing unit 201 may further include a read only memory (ROM) or an erasable programmable memory (EPROM) 227 or other static storage device coupled to bus 224 for storing static information and instructions for processor 222, such as basic input-output system (BIOS), as well as various system configuration parameters. A persistent storage device or non-volatile memory 226, such as a magnetic disk, optical disk, or solid-state flash memory device may be provided and may be coupled to bus 224 for storing information and instructions.

Computing unit 201 may be coupled via bus 224 to an integral display 221, possibly a touch-screen display, for use in displaying information to a user. If desired, computing unit 201 may be coupled via bus 224 to an external display screen 244. An external input device 243 (e.g., a standard keyboard) may be coupled to bus 224 for communicating information and command selections to processor 222. A cursor control device 242, such as a mouse, a trackball, or cursor direction keys, may be used for communicating direction information and command selections to processor 222 and for controlling cursor movement on display 244. An external storage device 241 may be connected to the computing unit 201 via bus 224 to provide an extra or removable storage capacity for the computing unit 201, which may be used to facilitate exchange of data with other computer systems.

Some of the techniques herein may be performed by computing unit 201 in response to processor 222 executing one or more sequences of one or more instructions contained in the volatile memory 225. Execution of the sequences of instructions contained in a non-transitory memory may cause processor 222 to perform the process steps described herein. In alternative embodiments, specific hard-wired digital circuitry may be used in place of, or in combination with, software instructions to implement the invention.

The term "computer-readable medium" as used herein refers to any medium that participates in providing instructions to processor 222 for execution. The computer-readable medium is just one example of a machine-readable medium, which may carry instructions for implementing any of the methods and/or techniques described herein. Various forms of computer readable media may contain one or more sequences of one or more instructions for the processor 222 to execute, including non-volatile media (storage device 226), and volatile media (storage device 225). Common forms of computer-readable media include, for example, a floppy disk, a hard disk, magnetic tape, or any other magnetic medium, a CD-ROM, a flash drive, and a memory card.

The computing unit 201 may thus also include a communication interface, such as network interface card 223 coupled to the data bus 222. Communication interface 223 may provide a two-way data communication coupling to a network link that may be connected to a local network. For example, communication interface 223 may be an integrated services digital network (ISBN) card or a modem to provide a data communication connection to a corresponding type of telephone line, or it may be a local area network interface card (LAN NIC) to provide a data communication connection to a compatible LAN.

Network link 223 also typically provides data communication to other network resources. For example, the network link may provide a connection over the internet 261 to the world-wide-web. Thus, the computing unit 201 can access resources located anywhere using the Internet 261. Also, the computing unit 201 may also be accessed by, or communicate with, other computers (e.g. 262), or another smart device (e.g., smartphone 263), generally with permission, and which may be located anywhere with access to the internet 261.

While illustrative implementations of one or more embodiments of the present invention are provided hereinabove, those skilled in the art and having the benefit of the present disclosure will appreciate that further embodiments may be implemented with various changes within the scope of the present invention. Other modifications, substitutions, omissions and changes may be made in the design, size, materials used or proportions, operating conditions, assembly sequence, or arrangement or positioning of elements and members of the exemplary embodiments without departing from the spirit of this invention.

Accordingly, the breadth and scope of the present disclosure should not be limited by any of the above-described example embodiments, but should be defined only in accordance with the following claims and their equivalents.

I claim:

1. A computer implemented method of simulating an artist's redrawing technique for creating a simulated watercolor image from a source image, said method comprising:
   inputting the source image into a computer system;
   adjusting one or more luminance values for lightening of the inputted image for producing an adjusted image;
   converting the adjusted image to a modified image;
   using an edge detection map to produce a control image;
   determining a set of colors used in the source image;
   determining a color region where each of the colors of the set of colors appear, and storing color values and color regions;
   coloring in multiple passes, in a diffusion of water technique emulating wet-on-wet watercoloring;
   coloring each of the color values with a darkening only color diffusion, by coloring in a light to dark order;
   adding jitter during said coloring using a noise pattern; and
   using the control image for said coloring in each of said multiple passes to control a diffusion geometry for each of the color regions.

2. The method according to claim 1 wherein said control image undergoes compositing to add sedimentation texture.

3. The method according to claim 1 wherein said control image undergoes compositing to add flocculation texture.

4. The method according to claim 1 wherein said control image undergoes compositing to add a drawing layer.

5. The method according to claim 1 wherein said modified image is a single channel image.

6. The method according to claim 1 wherein said modified image is a grayscale image.

7. A computer implemented method of simulating an artist's redrawing technique for creating a simulated watercolor image from a source image, said method comprising;
   inputting the source image into a computer system;
   adjusting one or more luminance values for lightening of the inputted image for producing an adjusted image;
   converting the adjusted image to a modified image;
   using an edge detection map to produce a control image;
   determining a set of colors used in the source image;
   determining a color region where each of the colors of the set of colors appear, and storing the color values and color regions;
   coloring in multiple passes, using the color values and color regions and adding jitter during said coloring using a noise pattern;
   coloring each of the color values by coloring in a light to dark order; and
   using the control image for said coloring in each of said multiple passes to control a diffusion geometry for each of the color regions.

8. The method according to claim 7 wherein said control image undergoes composting to add sedimentation texture.

9. The method according to claim 7 wherein said control image undergoes compositing to add flocculation texture.

10. The method according to claim 7 wherein said control image undergoes compositing to add a drawing layer.

11. The method according to claim 7 wherein said modified image is a single channel image.

12. The method according to claim 7 wherein said modified image is a greyscale image.

13. A computer implemented method of simulating an artist's redrawing technique for creating a simulated watercolor image from a source image, said method comprising:
   inputting the source image into a computer system;
   adjusting one or more luminance values for lightening of the inputted image for producing an adjusted image;
   converting the adjusted image to an image having one luminance value for the image per pixel;
   using an edge detection map to produce a control image;
   determining a set of colors used in the source image;
   determining a color region where each of the colors of the set of colors appear in the control image, and storing the color values and color regions;
   coloring in multiple passes, using the color values and color regions in a diffusion of water technique emulating wet-on-wet watercoloring, and adding jitter during said coloring using a noise pattern;
   coloring each of the color values with the darker colors traveling the shorter distance; and
   using the control image for said coloring in each of said multiple passes to control a diffusion geometry for each of the color regions.

14. The method according to claim 13 wherein said control image undergoes compositing to add sedimentation texture.

15. The method according to claim 13 wherein said control image undergoes composting to add flocculation texture.

16. The method according to claim 13 wherein said control image undergoes compositing to add a drawing layer.

17. The method according to claim 13 wherein said modified image is a single channel image.

18. The method according to claim 13 wherein said modified image is a greyscale image.

* * * * *